(12) United States Patent
Lloyd

(10) Patent No.: US 12,554,956 B2
(45) Date of Patent: Feb. 17, 2026

(54) SYSTEM FOR SECURING AND AUTHENTICATING ART PROPERTY RIGHTS

(71) Applicant: Kathryn Lloyd, St. George, UT (US)

(72) Inventor: Kathryn Lloyd, St. George, UT (US)

( * ) Notice: Subject to any disclaimer, the term of this patent is extended or adjusted under 35 U.S.C. 154(b) by 0 days.

(21) Appl. No.: 19/261,335

(22) Filed: Jul. 7, 2025

(65) Prior Publication Data

US 2025/0378292 A1   Dec. 11, 2025

Related U.S. Application Data

(63) Continuation-in-part of application No. 17/982,982, filed on Nov. 8, 2022, now abandoned.

(51) Int. Cl.
*G06K 19/02* (2006.01)
*G06K 19/06* (2006.01)
*G06Q 30/018* (2023.01)

(52) U.S. Cl.
CPC ..... *G06K 19/027* (2013.01); *G06K 19/06037* (2013.01); *G06Q 30/018* (2013.01)

(58) Field of Classification Search
CPC .......... G06K 19/027; G06K 19/06037; G06Q 30/018
USPC ........................................... 235/494
See application file for complete search history.

(56) References Cited

U.S. PATENT DOCUMENTS

| | | | |
|---|---|---|---|
| 2020/0057876 A1* | 2/2020 | Chang | G06K 19/0723 |
| 2022/0058732 A1 | 2/2022 | Reses | |
| 2023/0009304 A1* | 1/2023 | Jakobsson | G06Q 30/0241 |
| 2023/0114684 A1* | 4/2023 | Jakobsson | H04L 9/3213 |
| | | | 713/159 |
| 2024/0152935 A1* | 5/2024 | Lloyd | G06Q 30/0185 |
| 2025/0069094 A1* | 2/2025 | Weigold | G06K 19/06028 |

* cited by examiner

*Primary Examiner* — Daniel A Hess
(74) *Attorney, Agent, or Firm* — Flyer & Flyer, a Professional Law Corporation; David R. Flyer

(57) ABSTRACT

A computer driven system is proposed to allow for embedding of unique identification devices physically embedded in canvas, creating artwork on the canvas, scanning the original artwork, and then sending the scanned images to a master controller for purposes of registering the artwork. Rather than sending scanned images to a master controller remotely, a public website can be established to receive the scanned images.

5 Claims, 2 Drawing Sheets

US 12,554,956 B2

SYSTEM FOR SECURING AND AUTHENTICATING ART PROPERTY RIGHTS

FIELD OF THE INVENTION

The present invention relates to a virtual system for securing and authenticating the property rights of artists and explains the physical process for embedding a Quick Response ("QR") code into an artist's canvas. The system comprises a substrate (where the substrate can be canvas, linen, paper, masonite or wood) embedded with a physically integrated, unique QR code, where the QR code is chemically bonded into the back of the substrate during the manufacturing process. An artist can scan the QR code using a smartphone, which contains a non-transitory machine-readable medium storing instructions to upload metadata and a photographic image of the completed artwork. This metadata and photograph are sent as digital images to a blockchain-connected master controller which can receive, process, and store the photographic image of the completed artwork with the QR code, and then create a permanent registry entry tied to the artwork. The system enables the artist to register, license, and track the artwork's future ownership and resale, optionally earning royalties from future transfers.

BACKGROUND OF THE INVENTION

Artists should have the ability to inexpensively protect their work from fraudulent reproductions. Artwork that has been reduced to canvas or other base material is vulnerable to unwanted copying. The great art masters have had their works knocked-off. It has sometimes been said tongue-in-cheek, that of the 750 paintings and etchings created by Rembrandt, only 3,000 are still available.

A possible solution to restrict or eliminate unwanted copying, which is minimally expensive, easy to use, and provides irrefragable authentication of original artwork, is virtual artwork registration. By registration using internet resources, the artist can feel confident in creating art which will have remunerative value to him or her alone.

SUMMARY OF THE INVENTION

The invention involves the QR code embedded in the substrate material on which the artist will create his or her work of art. Substrate material can include, linen, paper, masonite, wood, or other materials. The QR code is commonly described as a two-dimensional, two-color barcode which is unique for each application. Each QR code stores information as a series of pixels in a square-shaped grid that can be read by a digital device, such as a smart phone.

An alternative is to use the QR code to improve accessibility of a Non-Fungible Token ("NFT"). This alternative permits greater storage capacity, where the substrate can be physically embedded with the NFT containing a QR code. The process for embedding the NFT is the same as for embedding the QR code in the substrate. The NFT is a cryptographic asset in a blockchain with unique identification codes and metadata to distinguish one NFT from another. A blockchain is a distributed database, which acts like a ledger, that is shared among the internet users on the network. As a database, a blockchain stores information electronically in digital format. The NFT is in current use serving as a medium for commercial transactions.

The elements of the system involve an artist creating an original art work on a substrate embedded with the QR code or the NFT. On completion the artist uses his or her smart phone to scan the original art work and send the scanned data to a computer terminal belonging to a master controller. The master controller will create a ledger or registry of the artwork for later use in verifying date/time of creation.

DETAILED DESCRIPTION OF EMBODIMENTS

Before any art is added to a base material which will later become the substrate, where the base material is a roll of cotton, canvas or linen, cold-pressed paper, pre-primed masonite, or pre-primed wood, the base material is carefully prepared. The goal of careful preparation is to make the QR code part of the structure itself, not just something attached later.

The base material receives its own unique QR code, which serves as a digital fingerprint. This QR code is generated securely and tied to a blockchain record that captures details including a manufacturer of the base material, a production date and a batch number, the base material type, and any other defining characteristics unique to a manufacturing process. This blockchain record is stored permanently, and the QR code gives artists and collectors a quick way to access the blockchain record and add their information.

Depending on the type of base material, the QR code is embedded into a back side of the base material meaning an opposite side from where the artwork is created, where the QR code becomes a permanent part of the structure without interfering in any way with the artist's creative surface. The following instructions, as explained in greater detail below, for embedding depend on the composition of the base material FIG. 2: For canvas and linen [206], the QR code [202] is printed directly onto the canvas or linen fibers, so the QR code is integrated into the weave of the fibers but is never visible or tactile from a front side of the canvas or linen where the art work will be created. For paper FIG. 2, the QR code [202] can be applied to the underside or back side of a sheet of paper. For masonite or wood [208], the QR code [202] is laser-etched or sealed onto the back side before any painting or framing occurs. In every case, the QR code is embedded into the base material [204], not just adhered to it. The embedding renders it impossible to remove or replace the QR code without completely damaging the art work; yet the QR code does not interfere with the artist's creative surface. After embedding of the QR code, the base material is then referred to as the substrate [205].

Figure 2:
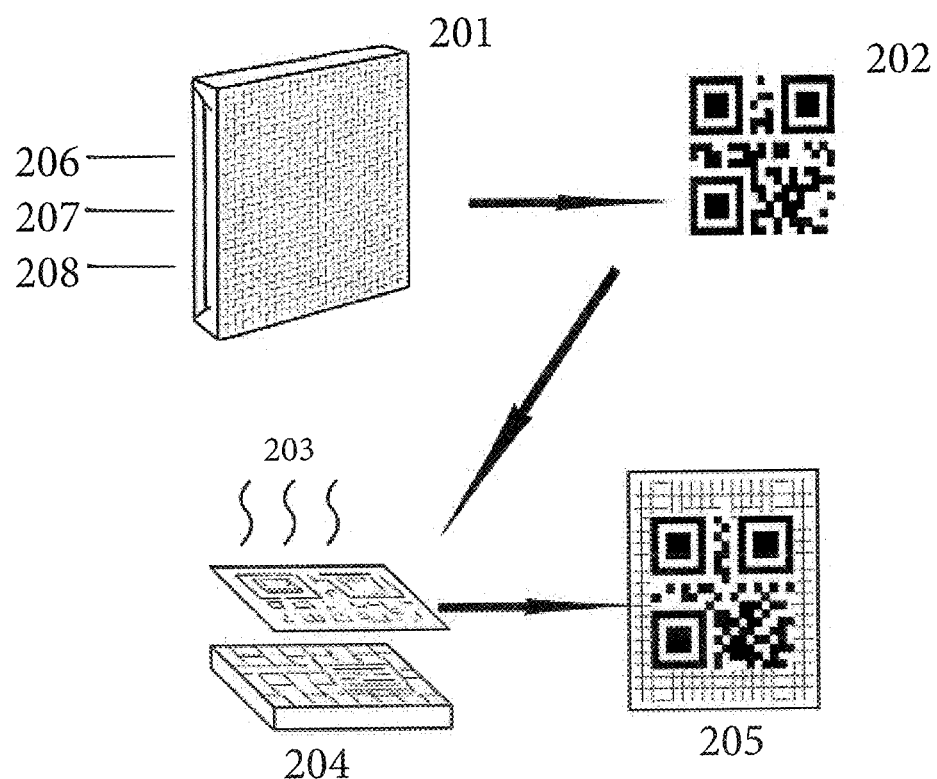
FIG. 2 depicts a flow chart for physically embedding the QR code on the substrate. A manufacturer prepares the base material, creates the QR code or the NFT, physically embeds the QR code or the NFT by a process specific to the base material, forms the substrate, and then sells or otherwise transfers the canvas with the QR code or NFT to the artist.

For canvas and linen as base material FIG. 2, the QR code [202] in a printing phase comprises using a solvent-free, archival-grade pigment ink formulated to chemically bond with textile fibers. This is not a surface label or sticker. The ink is deposited using a precision-controlled thermal or piezoelectric inkjet print head that directs the QR code onto the back side of the untreated canvas. This allows the pigment to sink into the weave. Once printed, then comes a sealing phase comprising a light application of clear acrylic gesso or archival sealing medium applied directly over the QR code area. This creates a transparent, flexible layer that locks the ink into the fibers. A drying phases comprises the base material passing through a drying tunnel or heat-curing processor (depending on the manufacturer's setup), which bonds both the pigment and the sealant into the weave, making it impossible to remove without damaging the base material itself.

For paper FIG. 2, the QR code [202] in a printing phase comprises printing by inkjet, then a sealing phase comprises application of a protective archival layer.

For masonite or wood FIG. 2, in a printing phase, the QR code [202] can be laser-etched directly into the primed surface, or a QR code ink layer can be applied, and then sealed.

Figure 1:
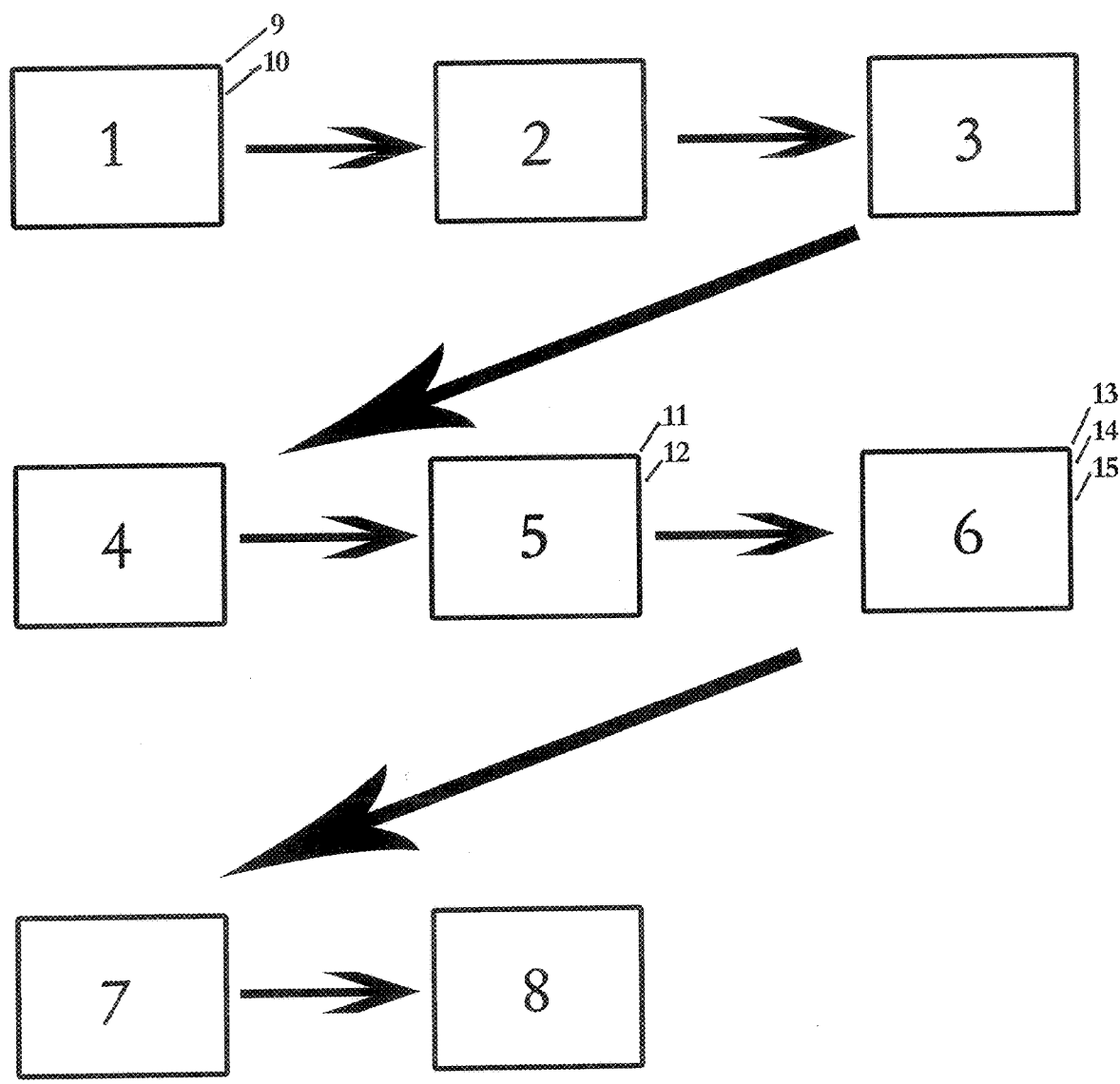
FIG. 1 contains a flow chart graphically depicting the elements of one embodiment of the system. Step one involves physically embedding the canvas with the QR code. Step two shows the QR code is sealed into the canvas. Step three shows the artist purchases the canvas with embedded QR code. Step four is the creation of the artwork. Step five is the artist scanning the QR code with a smart phone or other portable device. Step six involves electronically transmitting the scanned QR code to a master controller. Step seven is optional where the artist can contract to sell the artwork. Step eight is optional where the artist can license the artwork or create a digital image for display in a catalogue or other medium.

The QR code is printed FIG. 1 in the base material [1], and sealed [10], then the manufacturer processes the base material into the substrate [2]. The artist purchases or acquires the substrate [3]. The artist creates the artwork [4]. The artist scans the artwork with the embedded QR code [12], onto a device such as a smart phone which contains a tangible, non-transitory, machine readable medium storing instruction that when executed, can send the artwork and data related to the artwork in digital images [5]. The artist then transmits the digital images of the artwork to a master controller [6], which can receive [13], process [14], and store the digital images of the artwork with the QR code, and then create a permanent record or registry entry tied to the artwork. The artist can register the canvas to himself or herself, and add data about the artwork such as a title, information about materials used, a description of the inspiration, and a price. From the moment the canvas is made to the moment the art work is hung on a wall, there will be a complete digital trail of provenance. This process is not just a security measure, rather the process is a foundational system for protecting the integrity of artwork in a space where authenticity matters more than ever. The invention makes provenance part of the creative process.

Should an issue arise later as to authenticity of a piece of art, the canvas can be scanned for the presence of the QR Code or NFT and then checked against the registry. Each QR Code or NFT will be unique to the canvas on which the artist will create the original art work.

The artist can sell the artwork FIG. 1 with confidence that the artwork cannot be duplicated without the artist's permission. In another embodiment, instead of engaging in traditional sales of the artwork, the artist can license the artwork to potential buyers [8]. Since the registry or ledger system involving the embedded QR codes or the NFT always tracks the location of the art, the artist can also track sales or transfers of the art, and as applicable, continue to receive a share of each future transfer of his or her art. The potential buyers will have access to market information through the ledger system, and will be able to recover licensing fees paid through transfers to future licensees.

The problem being addressed is inexpensive authentication and protection of artwork. The technology for providing authentication is available in the form of machine readable barcodes, called QR codes, and in the NFT, which have increased storage capability. The NFT is used as a key building block in many diverse and non-centralized, cryptocurrency systems. The NFT can be adapted to accommodate storage of data from scanned images of art.

In another embodiment of the system, the system is computer driven comprising a tangible, non-transitory, machine readable medium storing instruction that when executed, sends data related to an original artwork painted on a canvas containing a physically embedded QR code, from at least one artist with a smart phone capable of scanning and sending a photographic representation of the original artwork, to a master controller with at least one computer with a terminal, monitor screen, and enabling software to receive, process, and store the data related to the original artwork. The master controller will then create a registry of all artwork received from at least one artist. The foregoing steps can be repeated by other artists without numerical limitation, since registration is virtual.

In another embodiment, the artist can access the master controller through a public website. Access to the website is available to all artists. In another embodiment, a device embedded in the canvas is a Non-Fungible Token ("NFT").

It is recognized that the description and the drawings are not intended to limit the present invention to a particular form as disclosed, rather the invention covers all modifications, equivalents, and alternatives which fall within the spirit and scope of the present invention.

I claim:

1. A computer driven system comprising:
a physically embedded Quick Response "QR" code which for a canvas as a substrate is printed using a pigment ink formulated to chemically bond with textile fibers,
where the pigment ink is deposited using a precision-controlled thermal head that directs the QR code onto the reverse side of the canvas,
where the pigment ink sinks into the weave of the canvas,
where a light application of sealant is applied directly over the QR code, creating a transparent, flexible layer that locks the pigment ink into the textile fibers of the canvas,
where the canvas then passes through a drying tunnel to bond both the pigment ink and the sealant into the textile fibers of the canvas,
where the canvas containing the QR code is purchased by an artist,
where art work is created by the artist on the canvas containing the QR code,
where the artist with a smart phone which contains a tangible, non-transitory, machine readable medium storing instruction that when executed, can send data related to an original artwork painted on a canvas containing the physically embedded QR code, scans the smart phone over the artwork and the QR code to generate digital images,
where the artists sends the digital images,
to a blockchain-connected master controller with at least one computer with a terminal, monitor screen, and enabling software to receive, process, and store the digital images, and where the master controller will then create a registry of all artwork received from the artist, based on the unique substrate identifier.

2. The system of claim 1, where the artist can access the master controller through a public website.

3. The system of claim 1, where a device embedded in the canvas is a Non-Fungible Token "NFT" containing a QR Code.

4. The system of claim 1, where the artist can sell the original artwork.

5. The system of claim 1, where the artist can license the original artwork and continue to track future sales or transfers of the original artwork, receiving a portion of each future sale or transfer.

* * * * *